US012523247B2

(12) United States Patent
Chiang

(10) Patent No.: US 12,523,247 B2
(45) Date of Patent: Jan. 13, 2026

(54) DECORATED TREE CONNECTING DEVICE, QUICK-CONNECT DECORATED TREE BRACKET AND WIRING METHOD THEREFOR

(71) Applicant: Ming-Yao Chiang, Kaohsiung (TW)

(72) Inventor: Ming-Yao Chiang, Kaohsiung (TW)

(*) Notice: Subject to any disclaimer, the term of this patent is extended or adjusted under 35 U.S.C. 154(b) by 95 days.

(21) Appl. No.: 18/358,976

(22) Filed: Jul. 26, 2023

(65) Prior Publication Data

US 2024/0018984 A1    Jan. 18, 2024

(30) Foreign Application Priority Data

Jul. 5, 2023 (CN) .......................... 202310823298.5

(51) Int. Cl.
*F16B 7/04*       (2006.01)
*A47G 33/06*      (2006.01)
*F21V 23/00*      (2015.01)
*F21W 121/04*     (2006.01)
*H01R 13/03*      (2006.01)

(52) U.S. Cl.
CPC .............. *F16B 7/042* (2013.01); *A47G 33/06* (2013.01); *F21V 23/001* (2013.01); *F21W 2121/04* (2013.01); *H01R 13/03* (2013.01)

(58) Field of Classification Search
CPC ........... F21S 4/10; F21S 19/00; F21V 23/001; F21V 35/00; F21L 27/00; H01R 13/052; F21W 2121/04; A47G 33/06; F16B 7/042
See application file for complete search history.

(56) References Cited

U.S. PATENT DOCUMENTS

| 8,870,404 | B1* | 10/2014 | Chen | F21S 4/10 |
| | | | | 362/249.02 |
| 10,973,354 | B1* | 4/2021 | Tsai | H01R 33/06 |
| 2008/0244882 | A1 | 10/2008 | Woxman | |
| 2008/0283717 | A1* | 11/2008 | Kim | A41G 1/007 |
| | | | | 248/524 |
| 2013/0108808 | A1* | 5/2013 | Leung | H01R 24/38 |
| | | | | 439/135 |
| 2014/0186107 | A1 | 7/2014 | Hermes et al. | |
| 2017/0361141 | A1 | 12/2017 | Kim | |

* cited by examiner

*Primary Examiner* — Omar Rojas Cadima
(74) *Attorney, Agent, or Firm* — Zhigang Ma

(57) ABSTRACT

The present invention discloses a decorated tree connecting device, a quick-connect decorated tree bracket and a wiring method therefor, which are used in the trunk structure of a decorated tree, comprising an upper connecting socket and a lower connecting socket; and when the upper connecting socket and the lower connecting socket are fitted by insertion, the connection point of an elastic copper connecting piece is in contact with a corresponding copper connecting piece, realizing the electrical connection fit of the upper connecting socket and the lower connecting socket.

3 Claims, 6 Drawing Sheets

DECORATED TREE CONNECTING DEVICE, QUICK-CONNECT DECORATED TREE BRACKET AND WIRING METHOD THEREFOR

TECHNICAL FIELD

The present invention belongs to the technical field of decorated tree brackets, and relates to a decorated tree connecting device, a quick-connect decorated tree bracket and a wiring method therefor.

BACKGROUND

To improve the indoor and outdoor environmental atmosphere, people often use artificial decorated trees and other artificial crafts to decorate the indoor and outdoor environment, and the most typical decorated tree is the decorated tree used in Christmas; and to create a better festive atmosphere, the corresponding decorative lamp strips are often arranged in the using process of the decorated tree. Therefore, it is also necessary to connect an external power source for the decorative lamp strips in the using process.

In the traditional wiring method, the whole wire and the decorative lamps are gradually wound around the decorated tree from the bottom up (or from the top down), the wire and the decorative lamps shall be wound around the trunk, branches and other positions, and the wire and the decorative lamps are wound to the bottom (top) direction of the decorated tree after being wound to the top, so as to realize the closed loop of the circuit by insertion at the bottom.

The wiring method has the following disadvantages:
1. More wires and decorative lamps are needed and wound repeatedly, a lot of materials are required, the cost is high, and repeated winding needs higher labor cost.
2. The more the winding number is, the longer the wire is, the more likely problems occur; and in case of movement in use, if the wire is broken due to pulling, it is troublesome to re-correct and re-connect the wire.

In the assembly process of the product, due to the above technical problems, the consumer needs to carry out the connection and arrange work of winding multiple wires and arranging multiple connecting plugs when arranging the lamp wires for the decorated tree, so the arrangement work is tedious and wastes time and cost; and because the wiring work is too tedious, large safety risks exit when the consumer carries out arrangement, and it is easy to cause circuit overload due to the wrong operation of the consumer, which may cause a fire of the circuit.

SUMMARY

To solve the above technical problems, the present invention adopts the following technical solution:

A decorated tree connecting device, which is applied in the trunk structure of a decorated tree, comprising an upper connecting socket and a lower connecting socket;

The upper connecting socket is composed of a plurality of upper socket housing elements, the upper connecting socket is hollow, and the upper end of the upper connecting socket is provided with two upper wiring holes communicated with the interior; the lower end of the upper connecting socket is an inserting segment, and the lower end face of the inserting segment is perforated to form an inner through hole; and two copper connecting pieces are arranged in the inserting segment of the upper connecting socket;

The lower connecting socket is composed of a housing sleeve and a plug pin housing arranged in the housing sleeve; and a slot is formed between the housing sleeve and the plug pin housing;

When the upper connecting socket and the lower connecting socket are fitted by insertion, the inserting segment of the upper connecting socket is inserted into the slot, and the plug pin housing is inserted into the upper connecting socket, realizing the insertion fit of the upper connecting socket and the lower connecting socket;

The plug pin housing is formed by buckling two symmetrical pin shells, the plug pin housing is hollow, and the lower end of the plug pin housing is provided with a lower wiring hole communicated with the interior; two elastic copper connecting pieces are arranged in the plug pin housing; the elastic copper connecting pieces correspond to the copper connecting pieces one by one; and a connection point is formed in the elastic copper connecting piece and penetrated from the plug pin housing;

When the upper connecting socket and the lower connecting socket are fitted by insertion, the connection point of the elastic copper connecting piece is in contact with the corresponding copper connecting piece, realizing the electrical connection fit of the upper connecting socket and the lower connecting socket.

As a further solution of the present invention, the housing sleeve and the plug pin housing are in a split structure.

A pin shell blocking platform is formed on the lower end of the plug pin housing, and the plug pin housing is inserted from the lower end of the housing sleeve; an annular blocking platform abutted against the pin shell blocking platform is formed in the housing sleeve, and the plug pin housing is limited by the fit of the annular blocking platform and the pin shell blocking platform; and a plurality of corresponding screw mounting holes are formed in the housing sleeve and the plug pin housing.

As a further solution of the present invention, a connecting hole for embedding the connection point of the elastic copper connecting piece is formed in the copper connecting piece.

A quick-connect decorated tree bracket and a wiring method therefor, the decorated tree bracket comprises: at least one group of trunk brackets, a group of tree top brackets located at the top and a group of tree root brackets located at the bottom;

The upper end of each trunk bracket is provided with a group of lower connecting sockets, and the lower end of each trunk bracket is provided with a group of upper connecting sockets;

The lower end of each tree top bracket is provided with a group of upper connecting sockets; and the upper end of each tree root bracket is provided with a group of lower connecting sockets;

Each tree top bracket and each tree root bracket are respectively provided with an outer wiring hole communicated with the interior; and each tree top bracket is provided with two outer wiring holes communicated with the interior;

The Wiring Method Comprises:
Wiring steps of the tree top bracket: a tree top lamp bead wire is led from the interior of the upper connecting socket on the tree top bracket, and wound around the top of the decorated tree as the top decorative lamp bead wire; and the positive and negative poles on both ends of the tree top lamp bead wire are respectively connected with two copper connecting pieces of the upper connecting socket on the tree top bracket;

Wiring steps of the tree root bracket: two lamp bead power wires are led from the interior of the lower connecting socket on the tree top bracket, the two lamp bead power wires are respectively a positive power wire and a negative power wire, one end of the positive power wire and one end of the negative power wire are connected with an electrical plug, and the other end of the positive power wire and the other end of the negative power wire are respectively connected with the two elastic copper connecting pieces in the lower connecting socket;

Wiring steps of the trunk bracket: a trunk lamp bead wire is led from the trunk bracket, and arranged around the whole decorated tree to achieve the overall decorative effect of the decorated tree; one end of the trunk lamp bead wire is connected to one elastic copper connecting piece of the lower connecting socket on the trunk bracket, and the other end is connected to one copper connecting piece of the upper connecting socket on the trunk bracket.

Assembly steps of the brackets: the trunk brackets are connected with another group of trunk brackets or tree top brackets or tree root brackets through the structural fit of the upper connecting sockets and the lower connecting sockets, and after the upper connecting sockets and the lower connecting sockets are fitted by insertion, the assembly of the tree top brackets is completed, and the tree top lamp bead wire, the trunk lamp bead wire and the lamp bead power wires are electrically connected together through the copper connecting piece and the elastic copper connecting piece in each upper connecting socket and each lower connecting socket to realize the closed loop of the circuit, so as to realize the connection of the power wires and the decorative lamps.

As a further solution of the present invention, the plug pin housing and the slot in the lower connecting socket, the inserting segment in the upper connecting socket and the inner through hole in the inserting segment are of a polygonal section structure.

As a further solution of the present invention, the upper connecting socket and the lower connecting socket are installed on the trunk bracket or the tree top bracket or the tree root bracket in the assembly manner of insertion;

Limiting pin holes for realizing positional installation are formed in the surfaces of the trunk bracket, the tree top bracket, the tree root bracket, the upper connecting socket and the lower connecting socket, and bead pins are installed in the limiting pin holes.

The present invention has the following beneficial effects: the combined structure composed of the upper connecting socket and the lower connecting socket can realize the quick wiring work and the assembly and fixing work, and compared with the traditional wiring method for decorative lamps of a decorated tree, the quick wiring method realized in the structure of the present application is to only arrange both ends of wires of trunk lamp beads in the upper and lower positions instead of rewinding the wires of trunk lamp beads to the lower end (or the upper end) of the tree body for connection; the effects of saving wires, reducing the wiring difficulty and realizing quick installation are achieved; the total winding length is reduced so that the circuit is not easily broken by pulling during the movement of the decorated tree; and meanwhile, the quick connecting device composed of the upper connecting socket and the lower connecting socket can prevent relative rotation at the trunk connection of the decorated tree, improve the stability of the bracket structure, avoid entanglement and pulling of the wires caused by the rotation of the trunk, and improve the stability and safety of the circuit arrangement.

DETAILED DESCRIPTION

Figure 1:
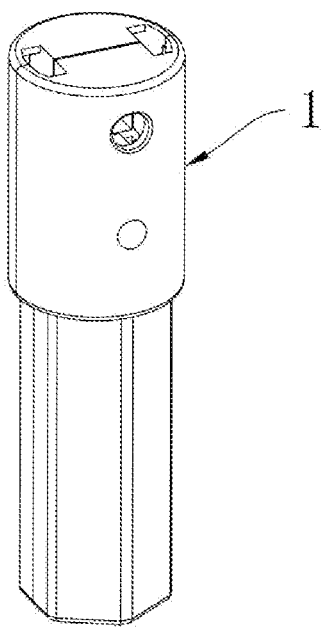
FIG. 1 is a structural schematic diagram of a decorated tree connecting device in the present invention.
Figure 1:
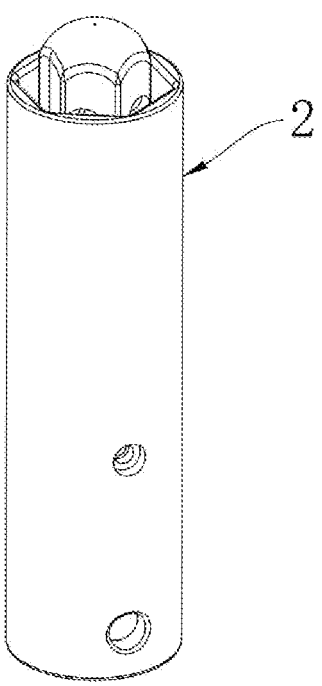
Figure 2:
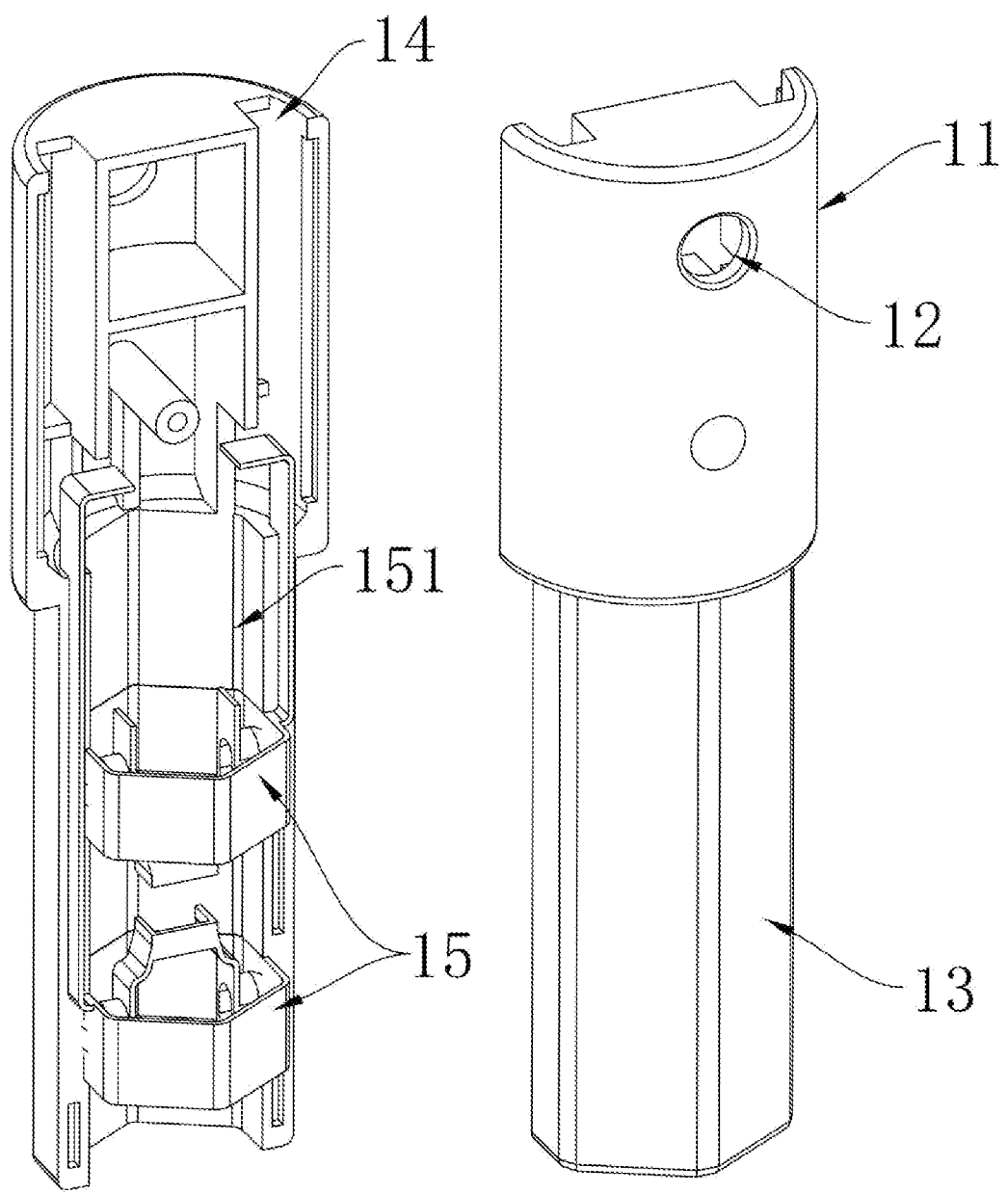
FIG. 2 is a structural schematic diagram of an upper connecting socket in the present invention.
Figure 3:
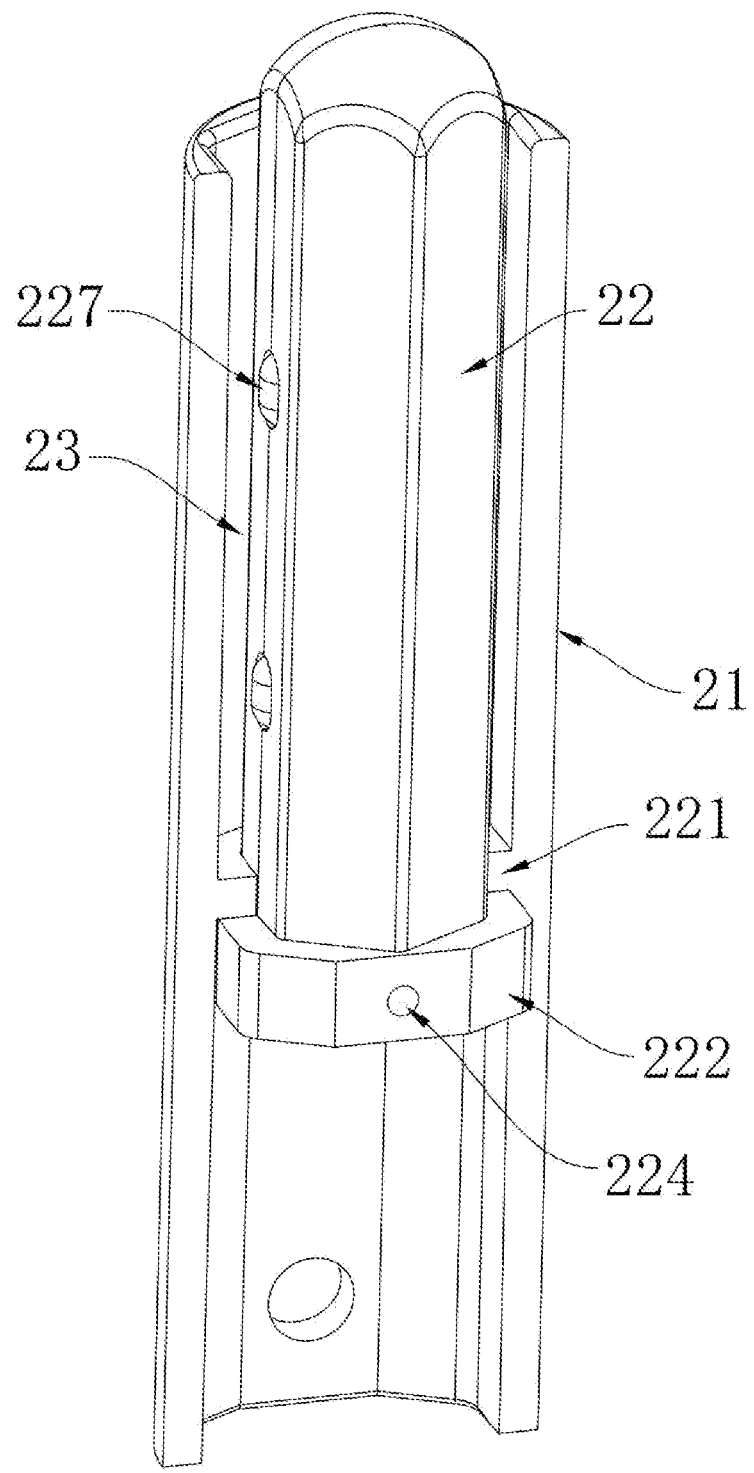
FIG. 3 is a structural schematic diagram of a lower connecting socket in the present invention.
Figure 4:
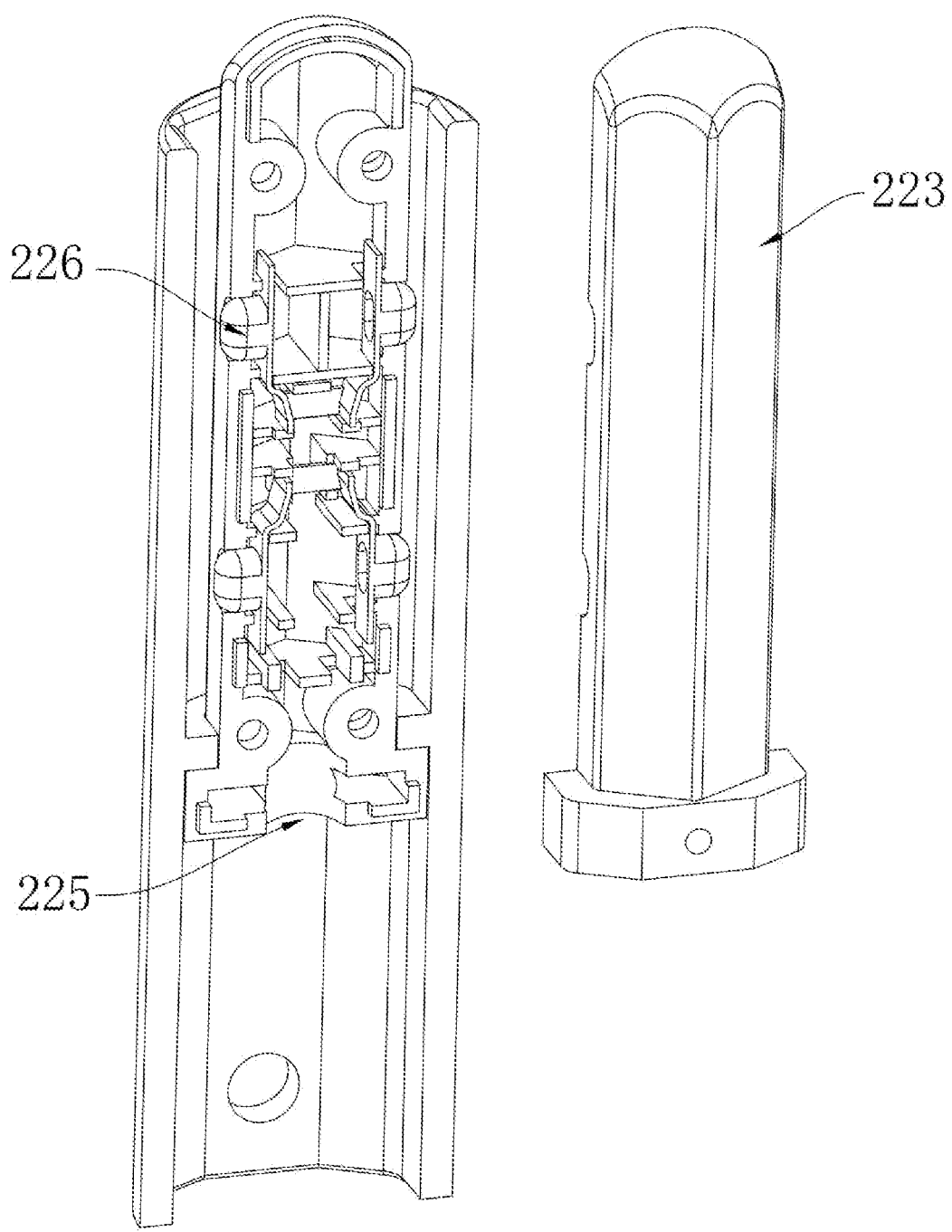
FIG. 4 is another structural schematic diagram of a lower connecting socket in the present invention.

The technical solution in the embodiments of the present application will be clearly and fully described below in combination with the drawings in the embodiments of the present application. Apparently, the described embodiments are merely part of the embodiments of the present application, not all of the embodiments. It should be understood that the present application is not limited by the example embodiments disclosed and described here. Based on the embodiments in the present application, all other embodiments obtained by those ordinary skilled in the art without contributing creative labor will belong to the protection scope of the present application.

It should be understood in the description of the present invention that terms such as "length", "width", "upper", "lower", "front", "rear", "left", "right", "vertical", "horizontal", "top", "bottom", "inner", "outer", etc. indicate direction or position relationships shown based on the drawings, and are only intended to facilitate the description of the present invention and the simplification of the description rather than to indicate or imply that the indicated device or element must have a specific direction or constructed and operated in a specific direction, and therefore, shall not be understood as a limitation to the present invention.

In addition, the terms such as "first" and "second" are only used for the purpose of description, rather than being understood to indicate or imply relative importance or hint the number of indicated technical features. Thus, the features limited by "first" and "second" can explicitly or impliedly comprise one or more features. In the description of the present invention, the meaning of "a plurality of" is two or more unless otherwise clearly specified.

In the embodiments of the present invention, unless otherwise specifically regulated and defined, terms such as "installation", "connected", "connecting", "fixed" and the like shall be understood in broad sense, and for example, may refer to fixed connection or detachable connection or integral connection, may refer to mechanical connection or electrical connection, and may refer to direct connection or indirect connection through an intermediate medium or inner communication of two elements or interaction relationship of two elements. For those ordinary skilled in the art, the specific meanings of the above terms in the present invention may be understood according to concrete conditions.

Referring to FIGS. 1-6, the present invention, in an embodiment, provides a subject, which is applied in the trunk structure of a decorated tree, comprising an upper connecting socket 1 and a lower connecting socket 2;

The upper connecting socket 1 is composed of a plurality of upper socket housing elements 11, the upper connecting socket 1 is hollow, and the upper end of the upper connecting socket 11 is provided with two upper wiring holes 14 communicated with the interior; the lower end of the upper connecting socket 1 is an inserting segment 13, and the lower end face of the inserting segment 13 is perforated to form an inner through hole; and two copper connecting pieces 15 are arranged in the inserting segment 13 of the upper connecting socket 1;

The lower connecting socket 2 is composed of a housing sleeve 21 and a plug pin housing 22 arranged in the housing sleeve 21; and a slot 23 is formed between the housing sleeve 21 and the plug pin housing 22;

When the upper connecting socket 1 and the lower connecting socket 2 are fitted by insertion, the inserting segment 13 of the upper connecting socket 1 is inserted into the slot 23, and the plug pin housing 22 is inserted into the upper connecting socket 1, realizing the insertion fit of the upper connecting socket 1 and the lower connecting socket 2;

The plug pin housing 22 is formed by buckling two symmetrical pin shells 223, the plug pin housing 22 is hollow, and the lower end of the plug pin housing 22 is provided with a lower wiring hole 225 communicated with the interior; two elastic copper connecting pieces 226 are arranged in the plug pin housing 22; the elastic copper connecting pieces 226 correspond to the copper connecting pieces 15 one by one; and a connection point 227 is formed in the elastic copper connecting piece 226 and penetrated from the plug pin housing 22;

When the upper connecting socket 1 and the lower connecting socket 2 are fitted by insertion, the connection point 227 of the elastic copper connecting piece 226 is in contact with the corresponding copper connecting piece 15, realizing the electrical connection fit of the upper connecting socket 1 and the lower connecting socket 2; and to ensure the connection stability of the connection point 227 and the copper connecting piece 15, a connecting hole 151 for embedding the connection point 227 of the elastic copper connecting piece 226 is formed in the copper connecting piece 15.

To facilitate the production and wiring of the lower connecting socket 2, the housing sleeve 21 and the plug pin housing 22 are manufactured in a split manner;

A pin shell blocking platform 222 is formed on the lower end of the plug pin housing 22, and the plug pin housing 22 is inserted from the lower end of the housing sleeve 21; an annular blocking platform 221 abutted against the pin shell blocking platform 222 is formed in the housing sleeve 21, and the plug pin housing 22 is limited by the fit of the annular blocking platform 221 and the pin shell blocking platform 222; and a plurality of corresponding screw mounting holes 224 are formed in the housing sleeve 21 and the plug pin housing 22.

Figure 5:
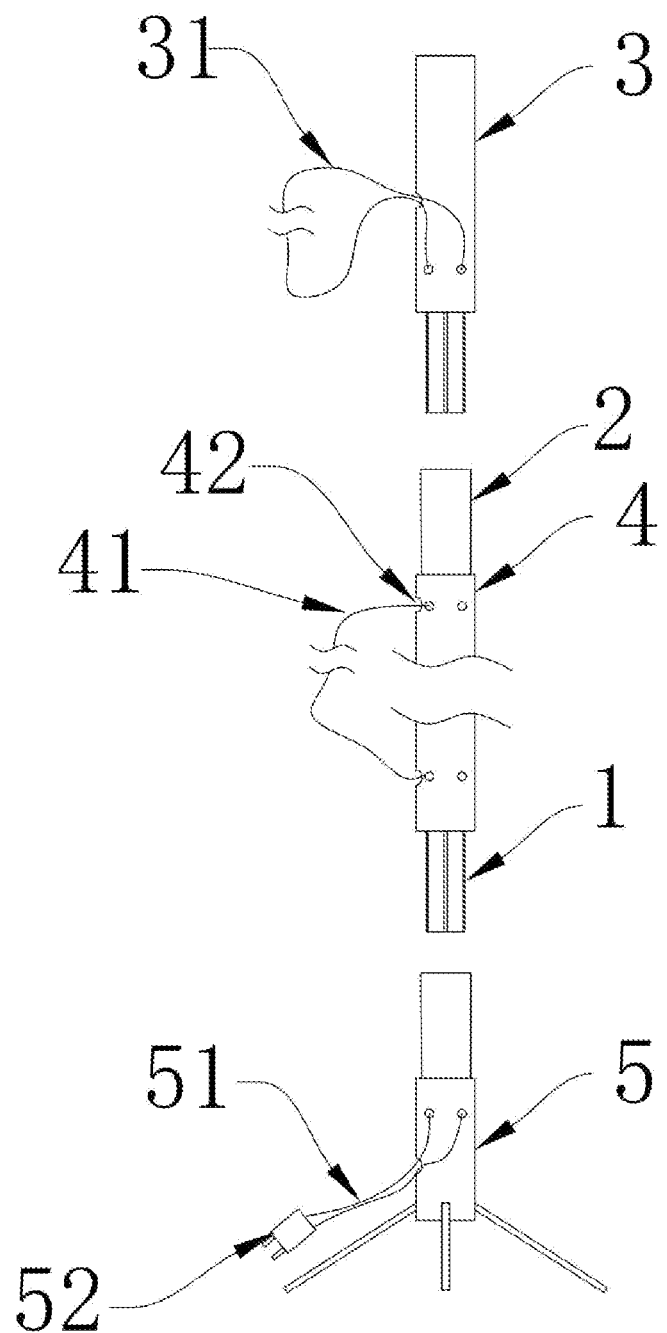
FIG. 5 is a schematic diagram of an embodiment of a quick wiring method in the present invention.
Figure 6:
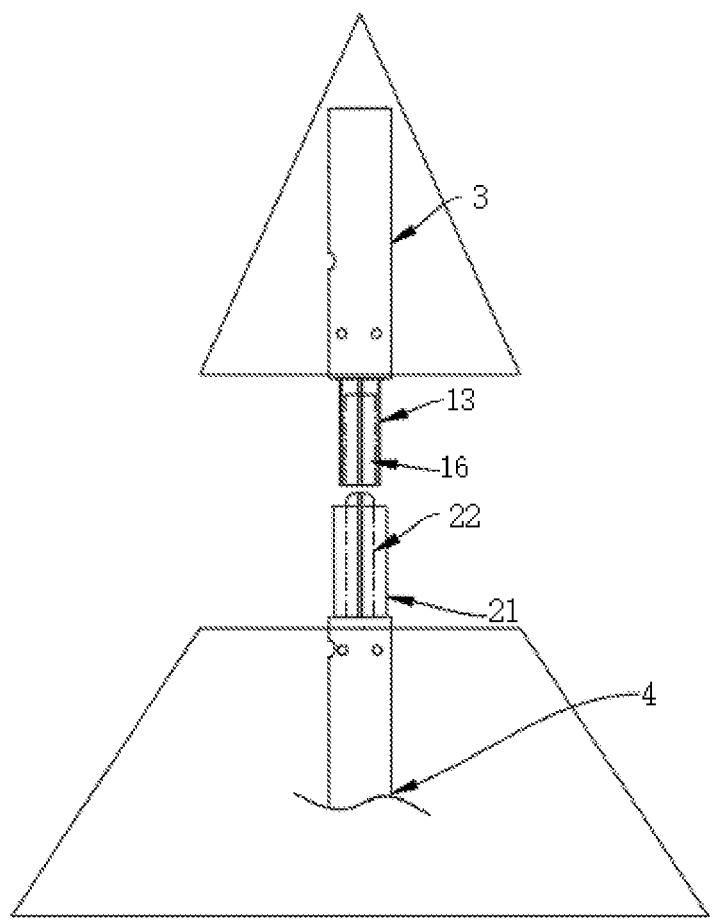
FIG. 6 is a schematic diagram of an embodiment of installation and arrangement of a decorated tree in the present invention.

As shown in FIG. 5, the present application also provides a quick-connect decorated tree bracket, the decorated tree bracket uses the upper connecting socket 1 and the lower connecting socket 2 in the above embodiment as connecting members, and the decorated tree bracket specifically comprises: at least one group of trunk brackets 4, a group of tree top brackets 3 located at the top and a group of tree root brackets 5 located at the bottom;

The upper end of each trunk bracket 4 is provided with a group of lower connecting sockets 2, and the lower end of each trunk bracket 4 is provided with a group of upper connecting sockets 1;

The lower end of each tree top bracket 3 is provided with a group of upper connecting sockets 1; and the upper end of each tree root bracket 5 is provided with a group of lower connecting sockets 2;

Each tree top bracket 3 and each tree root bracket 5 are respectively provided with an outer wiring hole 42 communicated with the interior; and each tree top bracket 3 is provided with two outer wiring holes 42 communicated with the interior;

The connection fit between the trunk brackets 4 or between the trunk bracket 4 and the tree top bracket 3 or the tree root bracket 5 is realized through the inserting structure of the upper connecting socket 1 and the lower connecting socket 2.

Preferably, the upper connecting socket 1 and the lower connecting socket 2 are installed on each bracket structure by means of insertion, and to enhance the firm degree of the insertion fit, limiting pin holes 12 for realizing positional installation are formed in the surfaces of the upper connecting socket 1 and the lower connecting socket 2, and bead pins are installed in the limiting pin holes 12; and equivalent pin holes are also formed in the trunk bracket 4, the tree top bracket 3 and the tree root bracket 5, and when the upper connecting socket 1 and the lower connecting socket 2 are fitted by insertion, bead pins in the limiting pin holes 12 are inlaid in the pin holes to realize stable insertion fit.

The present application also provides a wiring method for a quick-connect decorated tree bracket, specifically comprising:

Wiring steps of the tree top bracket 3: a tree top lamp bead wire 31 is led from the interior of the upper connecting socket 1 on the tree top bracket 3, wound around the top of the decorated tree as the top decorative lamp bead wire, and generally connected with the decorative lamps at the top of the decorated tree; and the positive and negative poles on both ends of the tree top lamp bead wire 31 are respectively connected with two copper connecting pieces 15 of the upper connecting socket 1 on the tree top bracket 3;

Wiring steps of the tree root bracket 5: two lamp bead power wires 52 are led from the interior of the lower connecting socket 2 on the tree top bracket 3, the two lamp bead power wires 52 are respectively a positive power wire and a negative power wire, one end of the positive power wire and one end of the negative power wire are connected with an electrical plug, and the other end of the positive power wire and the other end of the negative power wire are respectively connected with the two elastic copper connecting pieces 226 in the lower connecting socket 2;

Wiring steps of the trunk bracket 4: a trunk lamp bead wire 41 which is used as the lamp bead wire of the whole trunk of the decorated tree and is the longest of the three wires is led from the trunk bracket 4, and arranged around the whole decorated tree to achieve the overall decorative effect of the decorated tree; one end of the trunk lamp bead wire 41 is connected to one elastic copper connecting piece 226 of the lower connecting socket 2 on the trunk bracket 4, and the other end is connected to one copper connecting piece 15 of the upper connecting socket 1 on the trunk bracket 4; and the elastic copper connecting piece 226 and the copper connecting piece 15 connected with both ends of the trunk lamp bead wire 41 shall be the corresponding positive and negative copper pieces.

Assembly steps of the brackets: the trunk brackets 4 are connected with another group of trunk brackets 4 or tree top brackets 3 or tree root brackets 5 through the structural fit of the upper connecting sockets 1 and the lower connecting sockets 2, and after the upper connecting sockets 1 and the lower connecting sockets 2 are fitted by insertion, the assembly of the tree top brackets 3 is completed, and the tree top lamp bead wire 31, the trunk lamp bead wire 41 and the lamp bead power wires 52 are electrically connected together through the copper connecting piece 15 and the elastic copper connecting piece 226 in each upper connecting socket 1 and each lower connecting socket 2 to realize the closed loop of the circuit, so as to realize the connection of the power wires and the decorative lamps.

Further, the plug pin housing 22 and the slot 23 in the lower connecting socket 2, the inserting segment 13 in the upper connecting socket 1 and the inner through hole in the inserting segment 13 are of a polygonal section structure, and such assembly structure can prevent relative rotation when the insertion fit is realized, and improve the stability of the brackets.

It should also be noted that herein, relationship terms of first, second and the like herein are just used for differentiating one entity or operation from the other entity or operation, and do not necessarily require or imply any practical relationship or sequence between the entities or operations. Moreover, terms of "comprise", "include" or any other variant are intended to cover non-exclusive inclusion, so that a process, a method, an article or a device which includes a series of elements not only includes such elements, but also includes other elements not listed clearly or also includes inherent elements in the process, the method, the article or the device. Under the condition of no more limitation, the elements defined by a sentence "include one . . ." do not exclude additional identical elements in the process, the method, the article or the terminal device which includes the elements.

The above description of the disclosed embodiments enables those skilled in the art to realize or use the present application. Many modifications to these embodiments will be apparent to those skilled in the art. The general principle defined herein can be realized in other embodiments without departing from the spirit or scope of the present application. Therefore, the present application will not be limited to these embodiments shown herein, but will conform to the widest scope consistent with the principle and novel features disclosed herein.

The invention claimed is:

1. A quick-connect decorated tree bracket, wherein the decorated tree bracket comprises: at least one trunk brackets, a tree top brackets located at the top and a tree root brackets located at the bottom;
   an upper end of each trunk bracket is provided with a first lower connecting sockets, and a lower end of each trunk bracket is provided with a first upper connecting sockets;
   a lower end of each tree top bracket is provided with a second upper connecting sockets; and an upper end of each tree root bracket is provided with a second lower connecting sockets;
   each tree top bracket and each tree root bracket are respectively provided with an outer wiring hole communicated with an interior; and each trunk bracket is provided with two outer wiring holes communicated with an interior;
   wherein the first lower connecting socket and the second upper connecting socket are installed with each other in an assembly manner of insertion, and the first upper connecting socket and the second lower connecting socket are installed with each other in an assembly manner of insertion; and
   wherein limiting pin holes for realizing positional installation are formed in the surfaces of the first upper connecting socket and the second upper connecting socket, to receive bead pins.

2. The quick-connect decorated tree bracket according to claim 1, wherein a lower end of each of the first and second upper connecting sockets is provided with an inserting segment, a lower end face of the inserting segment is perforated to form an inner through hole; each of the first and second lower connecting sockets is provided with a housing sleeve and a plug pin housing arranged in the housing sleeve, and a slot is formed between the housing sleeve and the plug pin housing, the plug pin housing and the slot in the lower connecting socket, the inserting segment in the upper connecting socket and the inner through hole in the inserting segment are of a polygonal section structure.

3. The quick-connect decorated tree bracket according to claim 1, wherein each of the first and second upper connecting sockets is provided with two upper wiring through holes formed through an upper end thereof, and two copper connecting pieces formed at a lower end thereof; and each of the first and second lower connecting sockets is provided with two elastic copper connecting pieces, a connection point is formed on each of the elastic copper connecting pieces, and a connecting hole is formed on each of the copper connecting pieces for embedding the connection point.

* * * * *